US008411358B2

(12) United States Patent
Matsuo

(10) Patent No.: US 8,411,358 B2

(45) Date of Patent: Apr. 2, 2013

(54) MICROSCOPE APPARATUS

(75) Inventor: Yuichiro Matsuo, Tokyo (JP)

(73) Assignee: Olympus Corporation, Tokyo (JP)

( * ) Notice: Subject to any disclaimer, the term of this patent is extended or adjusted under 35 U.S.C. 154(b) by 17 days.

(21) Appl. No.: 12/944,772

(22) Filed: Nov. 12, 2010

(65) Prior Publication Data

US 2011/0122489 A1 May 26, 2011

(30) Foreign Application Priority Data

Nov. 20, 2009 (JP) ................................ 2009-265065
Jul. 26, 2010 (JP) ................................ 2010-167048

(51) Int. Cl.
*G02B 21/06* (2006.01)

(52) U.S. Cl. .................................... 359/385; 250/458.1

(58) Field of Classification Search ............... 250/458.1; 356/951–952; 359/385
See application file for complete search history.

(56) References Cited

U.S. PATENT DOCUMENTS

| | | | | |
|---|---|---|---|---|
| 5,473,706 | A * | 12/1995 | Bacus et al. | 382/133 |
| 6,094,300 | A * | 7/2000 | Kashima et al. | 359/385 |
| 7,724,426 | B2 | 5/2010 | Yamashita et al. | |
| 2003/0086145 | A1 | 5/2003 | DeSimone et al. | |
| 2007/0132998 | A1* | 6/2007 | Tang et al. | 356/417 |
| 2007/0247620 | A1* | 10/2007 | Koo | 356/301 |
| 2007/0262264 | A1* | 11/2007 | Hasegawa et al. | 250/458.1 |
| 2008/0156999 | A1* | 7/2008 | Nishiwaki et al. | 250/458.1 |
| 2009/0161208 | A1 | 6/2009 | Kempe et al. | |

FOREIGN PATENT DOCUMENTS

| | | |
|---|---|---|
| EP | 1 862 838 A2 | 12/2007 |
| JP | 2007-139870 A | 6/2007 |
| JP | 2007-334319 A | 12/2007 |
| JP | 4084303 A | 2/2008 |
| WO | WO 98/28655 A2 | 7/1998 |
| WO | WO 02/12863 A1 | 2/2002 |

OTHER PUBLICATIONS

Extended European Search Report (EESR) dated May 27, 2011 (in English) in counterpart European Application No. 10014576.2.

Hanley et al.: "Optical Sectioning Fluorescence Spectroscopy in a Programmable Array Microscope": Applied Spectroscopy: vol. 52, No. 6: pp. 783-789: Jun. 1, 1998.

* cited by examiner

*Primary Examiner* — Mark Consilvio

(74) *Attorney, Agent, or Firm* — Holtz, Holtz, Goodman & Chick, P.C.

(57) ABSTRACT

An arbitrary entire region of a specimen, or a plurality of individual regions, is simultaneously stimulated without a time lag, or a strong stimulus is applied to an arbitrary region of a specimen. The invention provides a microscope apparatus including a first stimulation optical system having a galvanometer mirror that scans a specimen with first stimulus light, which applies an optical stimulus to a specimen, on the specimen; a second stimulation optical system which has a plurality of two-dimensionally arrayed movable mirrors and which switches the angle of each movable mirror so that second stimulus light, which applies an optical stimulus to the specimen, can be selectively deflected towards the specimen; and a dichroic mirror that combines a light path of the first stimulation optical system and a light path of the second stimulation optical system.

11 Claims, 15 Drawing Sheets

50
60
80
81
83
85
MONITOR
MEMORY
GUI UNIT
69A
69B
71A
70
59
20
30
40
71A
71B
10
100

10
20
30
40
59
69A
69B
21
22
23
24A
24B
25
27
28
29
31
32
33
34A
34B
41
42
43
45A
45B
45C
45D
47
49A
49B
49C
9A
9B
9C
13A
13B
13C
13D
13E
13F
13G
13H
13I
13J
15A
15B
15C
17A
17B
19
S
11

47
48
48
48
48

50
60
80
81
83
85
MONITOR
MEMORY
GUI UNIT
69A
59
71A
70
71B
90
20
30
40
10
100

10
11
S
19
13D
17B
13C
13B
17A
13A
15A
13G
13F
13E
15B
13J
13I
13H
15C
9A
9B
9C
20
21
22
23
24A
24B
25
27
28
29
59
30
31
32
33
34A
34B
69A
40
43
45A
45B
45C
45D
47
49A
49B
49C
90
91

50
60
80
81
83
85
MONITOR
MEMORY
GUI UNIT
69A
71A
70
59
90
71B
20
240
71A
10
200

10
11
S
19
13D
17B
13C
17A
13B
15A
13A
13G
13F
15B
13J
13I
15C
13H
9A
9C
20
22
21
59
23
24A
24B
25
27
28
29
240
69A
31
33
34A
34B
232
242
43
91
90
45A
45B
47
49A
49B
235A
235B
235C
237
215
249c
245

MICROSCOPE APPARATUS

BACKGROUND OF THE INVENTION

1. Field of the Invention

The present invention relates to a microscope apparatus.

This application is based on Japanese Patent Application No 2009-265065 and No. 2010-167048, the content of which is incorporated herein by reference.

2. Description of Related Art

In a known microscope apparatus in the related art, a specimen is irradiated with stimulus light from a stimulation optical system, and various changes in the specimen due to the stimulation are observed with an observation optical system (for example, see Japanese Unexamined Patent Application, Publication No. 2007-334319, Japanese Unexamined Patent Application, Publication No. 2007-139870, and the Publication of Japanese Patent No. 4084303). In the microscope apparatus disclosed in Japanese Unexamined Patent Application, Publication No. 2007-334319, point stimulation and area stimulation are both possible by changing the numerical aperture of the stimulus light focused at the pupil plane of an objective lens, and stimulation of a wide area on a specimen is possible by scanning the stimulus light by using a scanning optical system. In the microscope apparatus disclosed in Japanese Unexamined Patent Application, Publication No. 2007-139870, a lamp light source that can irradiate a wide area with stimulus light is provided so that a wide area of a specimen can be optically stimulated all at once without scanning the stimulus light. In the microscope apparatus disclosed in the Publication of Japanese Patent No. 4084303, a DMD (digital micromirror device, microdeflection element array) is used in an illumination device so that a desired region at any position on the specimen can be irradiated with stimulus light.

With the microscope apparatus disclosed in Japanese Unexamined Patent Application, Publication No. 2007-334319, a time lag occurs at the start of scanning and the end of scanning when scanning a wide area of the specimen by using the scanning optical system, and in some cases it may not be possible to perform stimulation simultaneously within the same area. With the microscope apparatus disclosed in Japanese Unexamined Patent Application, Publication No. 2007-139870, it is not possible to change the area to be stimulated according to the shape of the specimen, nor to stimulate a plurality of positions simultaneously. With the microscope apparatus disclosed in the Publication of Japanese Patent No. 4084303, the power of the stimulus light is low, and it is not possible to stimulate a specimen with sufficient intensity in applications where a specimen is stimulated with an intense spot.

BRIEF SUMMARY OF THE INVENTION

The present invention provides a microscope apparatus which can simultaneously stimulate an arbitrary entire region or a plurality of regions of a specimen without any time lag, and which can apply an intense stimulus to a desired region of a specimen.

The present invention provides a microscope apparatus including a first stimulation optical system having a scanning unit that scans first stimulus light, which applies an optical stimulus to a specimen, on the specimen; a second stimulation optical system having a spatial light modulator that can selectively switch an irradiation position of second stimulus light, which applies an optical stimulus to the specimen, on the specimen; and a stimulation light-path combining section that combines a light path of the first stimulation optical system and a light path of the second stimulation optical system.

According to the present invention, with the first stimulation optical system, which applies a light stimulus to the specimen with the first stimulus light, and the second stimulation optical system, which applies a light stimulus to the specimen with the second stimulus light, it is possible to stimulate the specimen with different stimulus patterns. By scanning the first stimulus light over the specimen using the scanning unit in the first stimulation optical system, it is possible to stimulate a wide area of the specimen while reducing light loss. Also, in the second stimulation optical system, by radiating the second stimulus light while selectively switching the irradiation position of the second stimulus light on the specimen by using the spatial light modulator, it is possible to stimulate an arbitrary entire region at the same time or to stimulate multiple regions simultaneously.

In this case, by combining the light path of the first stimulation optical system and the light path of the second stimulation optical system with the stimulation light-path combining section, it is possible to use these optical systems at the same time without switching between them. Therefore, merely by selecting the first stimulation optical system or the second stimulation optical system, it is possible to rapidly adapt to applications where an intense stimulus is applied to the specimen or applications where an arbitrary entire region or a plurality of regions on the specimen are stimulated simultaneously without any time lag, thus performing the desired optical stimulation.

In the above-described invention, the spatial light modulator may include plurality of microelements arrayed two-dimensionally and may control the transmittance of each microelement to selectively transmit the second stimulus light towards the specimen.

In the above-described invention, the spatial light modulator may include a plurality of microdeflection elements arrayed two-dimensionally and may switch the angle of each microdeflection element to selectively deflect the second stimulus light towards the specimen.

In the above-described invention, a plurality of the first stimulation optical systems may be provided. With this configuration, it is possible to simultaneously irradiate a plurality of regions on the specimen with an intense light stimulus, making it possible to adapt the system to a wider range of applications.

The above-described invention may further include a light-level-adjustment storage unit that stores, in association with each other, a relationship between an intensity of the optical stimulus from the first stimulation optical system and a light level of the first stimulus light and a relationship between an intensity of the optical stimulus from the second stimulation optical system and a light level of the second stimulus light; and a light-level adjusting unit that adjusts, depending on the light level of one of the first stimulus light and the second stimulus light, the light level of the other one of the first stimulus light and the second stimulus light.

With this configuration, using the light-level adjusting unit, it is possible to associate the light stimulus from the first stimulation optical system and the light stimulus from the second stimulation optical system, which are applied to the same specimen. For example, applications where the specimen is stimulated by the first stimulation optical system or the second stimulation optical system can be easily employed in the other, that is, the second stimulation optical system or the first stimulation optical system.

The above-described invention may further include an observation optical system that acquires an image of the specimen; and a whole-light-path combining section that combines a light path of the observation optical system with the light paths of the first stimulation optical system and the second stimulation optical system combined by the stimulation light-path combining section.

With this configuration, it is possible to observe the condition of the specimen from an image of the specimen acquired by the observation optical system. In this case, by using the whole-light-path combining section, it is possible to simultaneously use the observation optical system, the first stimulation optical system, and the second stimulation optical system without switching between them, and various changes in the specimen due to the stimulation can be observed on the image without missing them.

The above-described invention may further include a region-specifying unit that specifies, on the image acquired by the observation optical system, individual stimulation regions to be stimulated by the first stimulation optical system and the second stimulation optical system.

With this configuration, it is possible to stimulate a desired stimulation region on the specimen, which is selected in the image by using the region-specifying unit, with the first stimulation optical system and the second stimulation optical system, and it is thus possible to efficiently perform observation with the observation optical system and optical stimulation with each of the stimulation optical systems.

The above-described invention may further include an adjusting unit that adjusts scanning conditions of the scanning unit and an irradiation position of the second stimulus light on the specimen with the spatial light modulator.

With this configuration, the position and size of the area irradiated with stimulus light in each stimulation optical system is adjusted using the adjusting unit, and it is possible to align each stimulation region specified with the region-specifying unit with the actual stimulation regions stimulated with the stimulus light. Accordingly, it is possible to easily and precisely stimulate a desired region of the specimen.

The above-described invention may further include an adjustment storage unit that stores the adjusted scanning conditions of the scanning unit and the irradiation position of the second stimulus light on the specimen with the spatial light modulator, as adjusted by the adjusting unit.

With this configuration, when the stimulation region on the image is aligned with the area irradiated with stimulus light from each stimulation optical system by using the adjusting unit, it is possible to easily perform subsequent position adjustment on the basis of the scanning conditions of the scanning unit and the irradiation position of the second stimulus light on the specimen via the spatial light modulator, which are stored in the adjustment storage unit.

In the above-described invention, the first stimulation optical system, the second stimulation optical system, and the stimulation light-path combining section may be accommodated in the same housing.

With this configuration, it is possible to precisely combine, in advance, the light paths of the first stimulation optical system and the second stimulation optical system using the stimulation light-path combining section inside the housing. Therefore, using the whole-light-path combining section, light path adjustment is simplified when assembling the stimulation optical system and the observation optical system.

In the above-described invention, a plurality of the first stimulation optical systems may be provided. With this configuration, it is possible to simultaneously irradiate a plurality of regions on the specimen with intense light stimuli, making it possible to adapt the system to a wider range of applications.

The above-described invention may further include a control unit that controls the image acquisition by the observation optical system, irradiation timing of the first stimulus light by the first stimulation optical system, and irradiation timing of the second stimulus light by the second stimulation optical system.

With this configuration, using the control unit, observation with the observation optical system and optical stimulation with each of the stimulation optical systems can be easily synchronized, for the same specimen.

The present invention affords an advantage in that it is possible to simultaneously stimulate an arbitrary entire region or a plurality of regions of a specimen without any time lag, and to apply an intense stimulus to any region on the specimen.

DETAILED DESCRIPTION OF THE INVENTION

First Embodiment

A microscope apparatus according to a first embodiment of the present invention will be described below with reference to the drawings.

Figure 1:
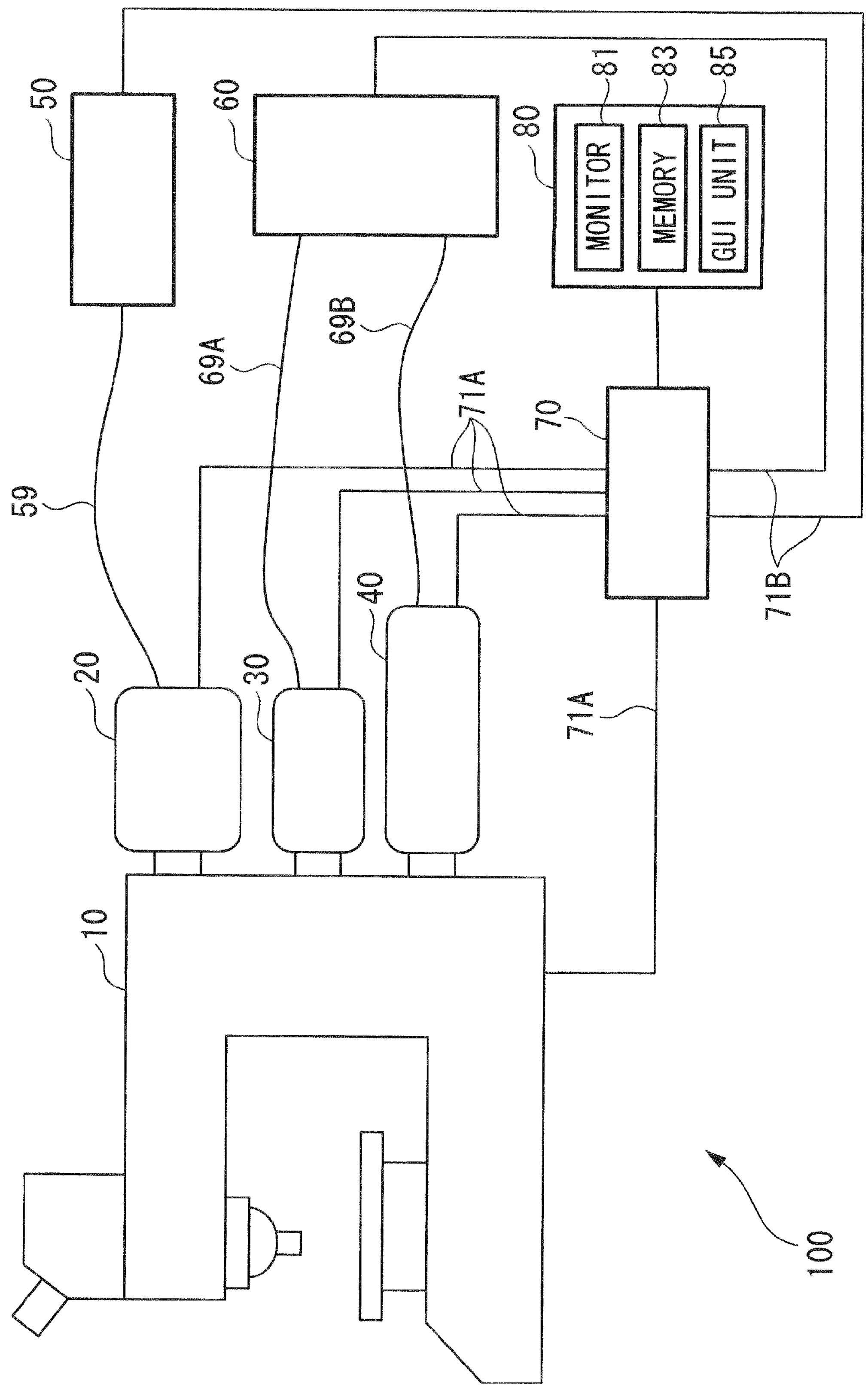
FIG. 1 is a diagram showing, in outline, the configuration of a microscope apparatus according to a first embodiment of the present invention.

As shown in FIG. 1, a microscope apparatus 100 according to this embodiment includes a microscope main unit 10, an observation unit 20 for observing a specimen S, such as cells (see FIG. 2), an observation laser combiner 50 that supplies laser light to the observation unit 20, a first stimulus unit 30 and a second stimulus unit 40 that optically stimulate the specimen S, a stimulation laser combiner 60 that supplies laser light to these stimulus units 30 and 40, a control box (control unit) 70 that controls the microscope main unit 10, the observation unit 20, the stimulus units 30 and 40, and the laser combiners 50 and 60, and a computer 80 that controls the overall apparatus via the control box 70.

The microscope apparatus 100 also includes an observation optical fiber 59 that guides laser light from the observation laser combiner 50 to the observation unit 20, a first stimulation optical fiber 69A and a second stimulation optical fiber 69B that guide laser light from the stimulation laser combiner 60 to the first stimulus unit 30 and the second stimulus unit 40, respectively, first control lines 71A that electrically connect the observation unit 20 and the stimulus units 30 and 40 to the control box 70, and second control lines 71B that electrically connect the laser combiners 50 and 60 to the control box 70.

Figure 2:
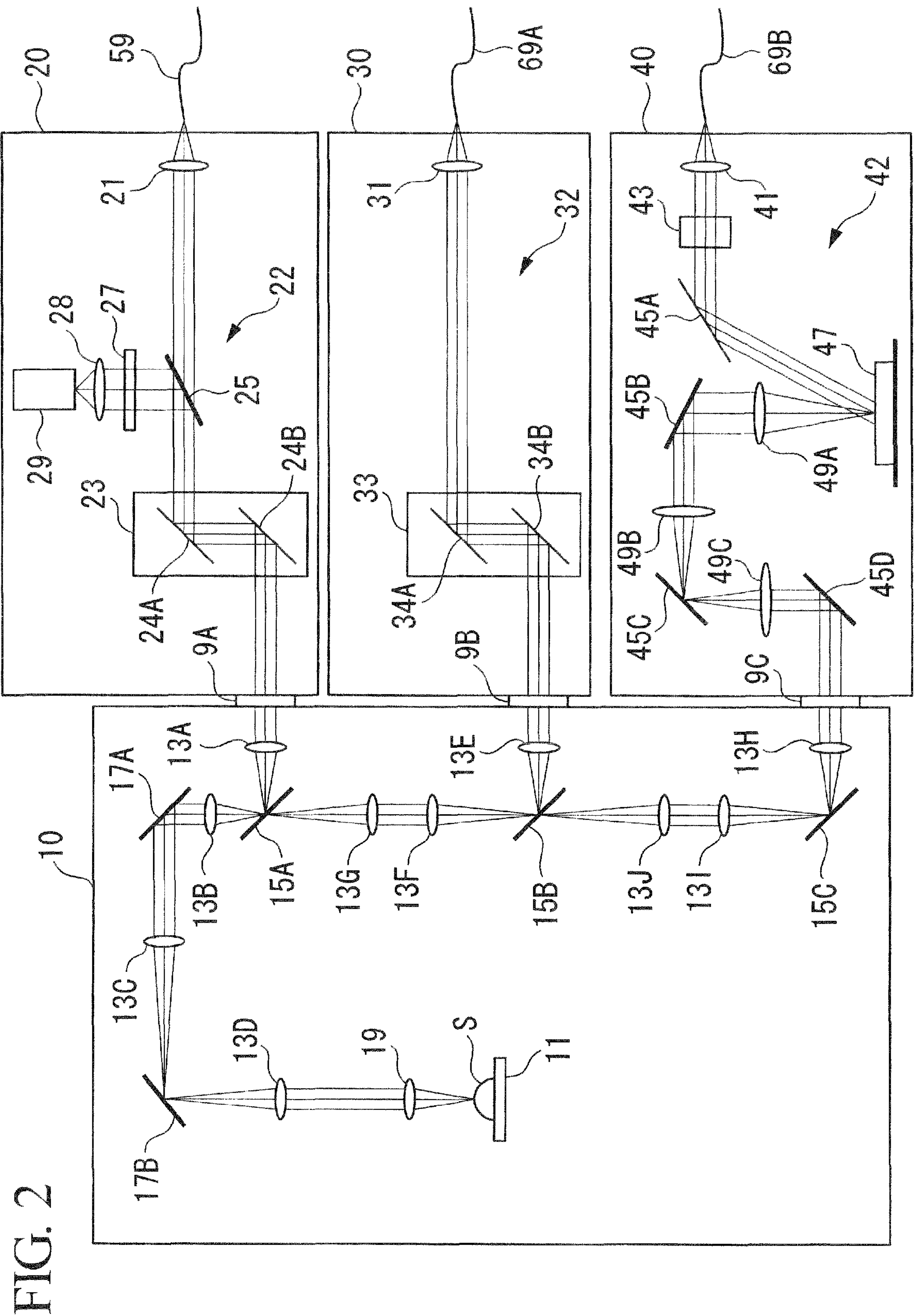
FIG. 2 is a diagram showing, in outline, the configuration of a microscope main unit, an observation unit, a first stimulus unit, and a second stimulus unit in FIG. 1.

As shown in FIG. 2, the microscope main unit 10 includes a connection port 9A to which the observation unit 20 is connected, a connection port 9B to which the first stimulus unit 30 is connected, and a connection port 9C to which the second stimulus unit 40 is connected.

The microscope main unit 10 also includes a stage 11 on which the specimen S is mounted, a relay optical system 13A that relays laser light incident from the observation unit 20 via the connection port 9A, a dichroic mirror (whole-light-path combining section) 15A that reflects laser light from the relay optical system 13A and light returning from the specimen S and transmits laser light from the stimulus units 30 and 40, a relay optical system 13B that relays laser light that has passed through the dichroic mirror 15A, a folding mirror 17A, a relay optical system 13C, a folding mirror 17B, a relay optical system 13D, and an objective lens 19 that irradiates the specimen S with the laser light from the relay optical system 13D and collects light returning from the specimen S.

The microscope main unit 10 is also provided with a relay optical system 13E that relays laser light incident from the first stimulus unit 30 via the connection port 9B, a dichroic mirror (stimulation light-path combining section) 15B that reflects laser light from the relay optical system 13E and transmits laser light from the second stimulus unit 40, relay optical systems 13F and 13G that relay the laser light that has passed through the dichroic mirror 15B, and a relay optical system 13H, a folding mirror 15C, and relay optical systems 13I and 13J that relay laser light incident from the second stimulus unit 40 via the connection port 9C.

The dichroic mirror 15A is arranged to combine the light path of the laser light irradiating the specimen S from the observation unit 20 and the light path of the laser light irradiating the specimen S from the stimulus units 30 and 40. The dichroic mirror 15B is arranged to combine the light path of the laser light irradiating the specimen S from the first stimulus unit 30 and the light path of the laser light irradiating the specimen S from the second stimulus unit 40.

The observation unit 20 includes an observation optical system 22 for acquiring an image of the specimen S.

The observation optical system 22 includes a collimator lens 21 that converts the laser light guided by the observation optical fiber 59 (hereinafter referred to as "observation laser light") to substantially collimated light and a scanning unit 23 including galvanometer mirrors 24A and 24B that scan the observation laser light substantially collimated by the collimator lens 21 over the specimen S in the microscope main unit 10. The observation laser light scanned by the scanning unit 23 is arranged to be incident on the relay optical system 13A of the microscope main unit 10 via the connection port 9A.

The observation optical system 22 is also provided with a dichroic mirror 25 that transmits light incident on the scanning unit 23 from the collimator lens 21 and that reflects light returning from the specimen S and descanned by the scanning unit 23; an emission filter 27 that selectively transmits only light of fluorescence wavelengths and blocks light of other wavelengths; a focusing lens 28 that focuses the fluorescence transmitted through the emission filter 27; and a photoelectric conversion device 29, such as a CCD, that acquires an image of the fluorescence focused by the focusing lens 28.

The first stimulus unit 30 includes a first stimulation optical system 32 that can stimulate the specimen S via laser scanning.

The first stimulation optical system 32 includes a collimator lens 31 that converts the laser light guided by the first stimulation optical fiber 69A (hereinafter referred to as "first stimulus light") to substantially collimated light and a scanning unit 33 including galvanometer mirrors (scanning portions) 34A and 34B that scan the first stimulus light substantially collimated by the collimator lens 31 over the specimen S. The first stimulus light scanned by the scanning unit 33 is arranged to be incident on the relay optical system 13E of the microscope main unit 10 via the connection port 9B.

The second stimulus unit 40 includes a second stimulation optical system 42 that is capable of multipoint simultaneous stimulation or region-specific stimulation of the specimen S, by selectively switching the irradiation position of the second stimulus light on the specimen S.

The second stimulation optical system 42 includes a collimator lens 41 that converts laser light guided by the second stimulation optical fiber 69B (hereinafter referred to as "second stimulus light") into substantially collimated light; an equalizing optical system 43 that equalizes the cross-sectional intensity distribution of the second stimulus light substantially collimated by the collimator lens 41; a DMD (Digital Mirror Device, spatial light modulator) 47 that can deflect the second stimulus light that has passed through the equalizing optical system 43 and been reflected by a folding mirror 45A towards the specimen S; and a relay optical system 49A, a folding mirror 45B, a relay optical system 49B, a folding mirror 45C, a relay optical system 49C, and a folding mirror 45D that relay the second stimulus light deflected by the DMD 47. The second stimulus light reflected by the folding mirror 45D is arranged to be incident on the relay optical system 13H of the microscope main unit 10 via the connection port 9C.

Figure 3:
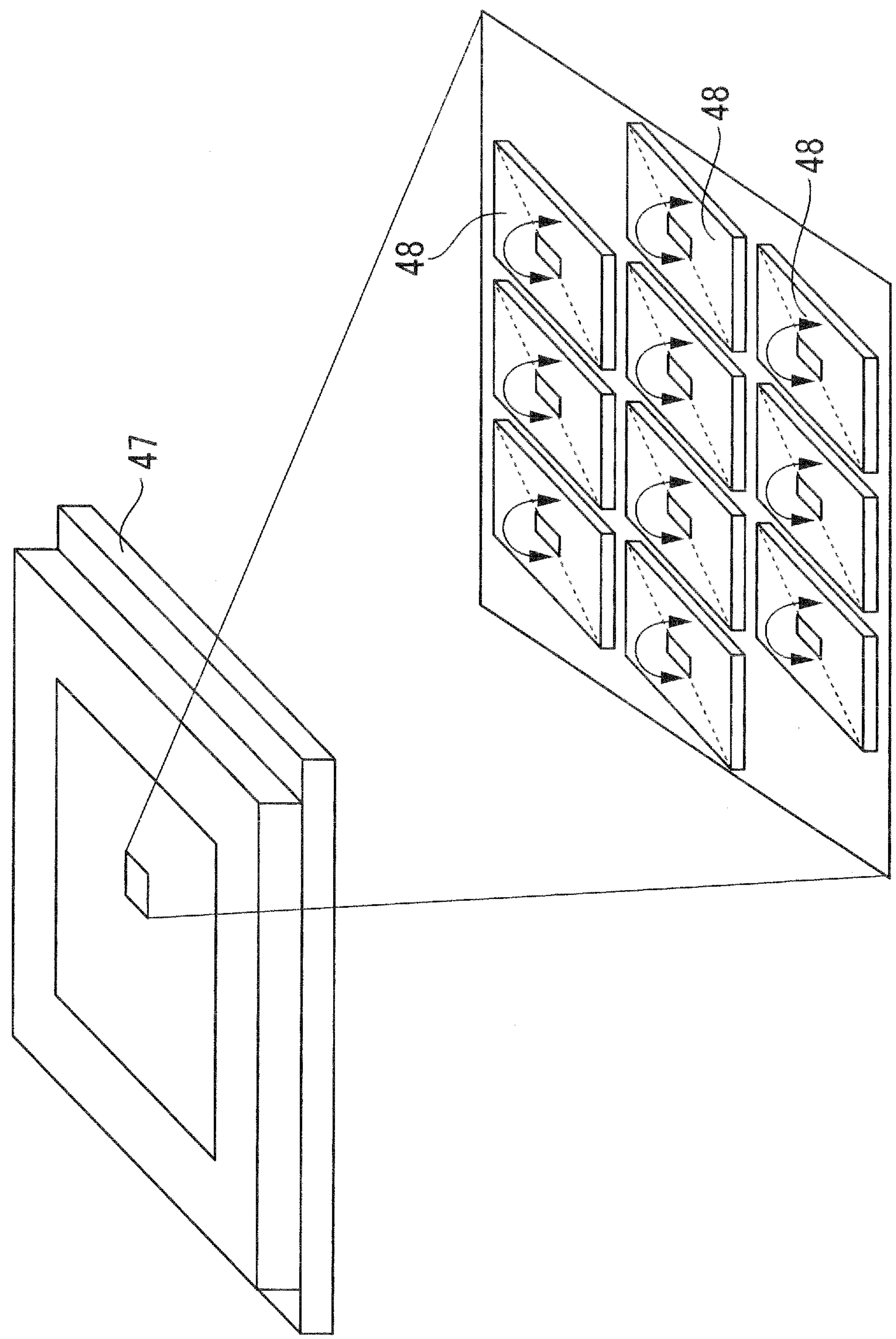
FIG. 3 is a magnified schematic diagram of movable mirrors in a DMD of the second stimulus unit.

As shown in FIG. 3, the DMD 47 is formed by two-dimensionally arraying a plurality (for example 1024×768) movable mirrors (microdeflection elements) 48 with a side length of about 10 to 20 μm. This DMD 47 is configured so that the angle of each movable mirror 48 can be switched ON/OFF by inputting driving signals from the control box 70.

Figure 4A:
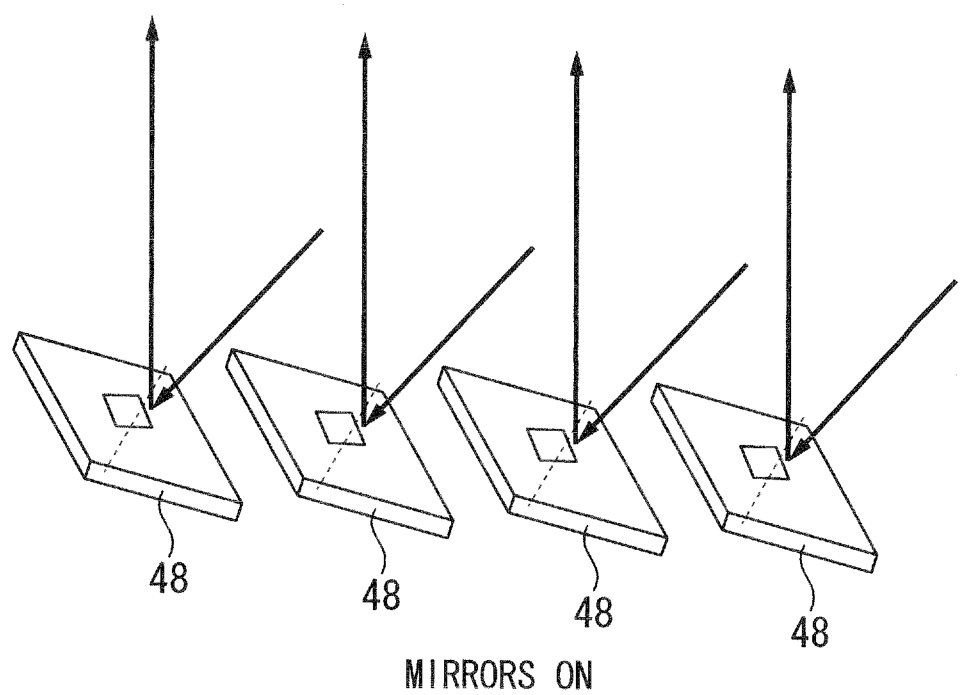
FIG. 4A is a diagram showing the movable mirrors with ON-state angles.
Figure 4B:
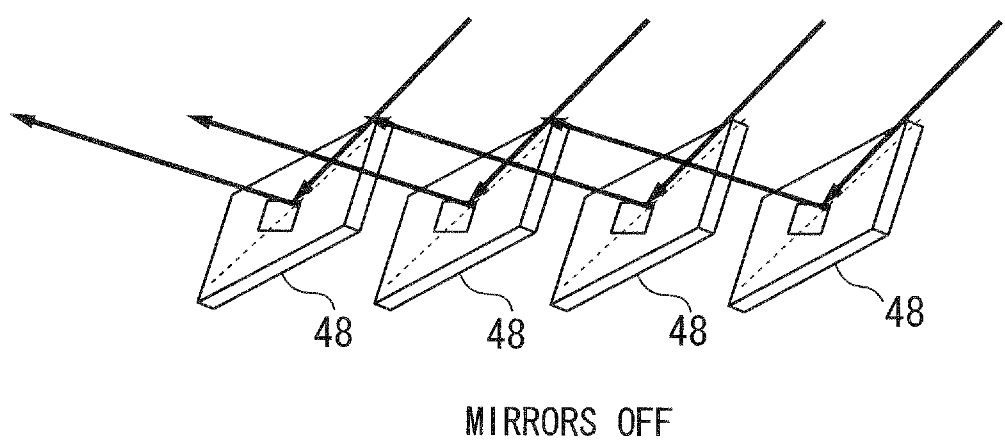
FIG. 4B is a diagram showing the movable mirrors with OFF-state angles.

For example, as shown in FIG. 4A, in the case of the ON-state angle, the movable mirrors 48 reflect the second stimulus light towards the specimen S in the microscope main unit 10, and as shown in FIG. 4B, in the case of the OFF-state angle, the movable mirrors 48 reflect the second stimulus light in a direction different from that in the ON-state, that is, in a direction other than towards the specimen S.

Figure 5:
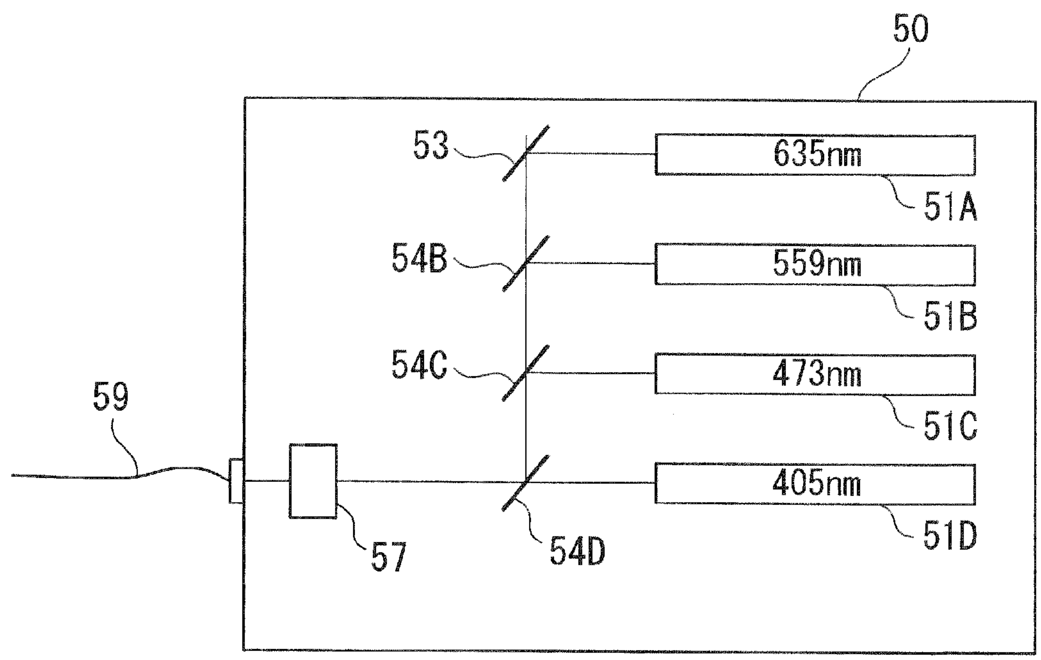
FIG. 5 is a diagram showing, in outline, an observation laser combiner in FIG. 1.

As shown in FIG. 5, the observation laser combiner 50 includes a first laser unit 51A that outputs laser light with a wavelength of 635 nm, a second laser unit 51B that outputs laser light with a wavelength of 559 nm, a third laser unit 51C that outputs laser light with a wavelength of 473 nm, and a fourth laser unit 51D that outputs laser light with a wavelength of 405 nm.

The observation laser combiner 50 also includes a reflecting mirror 53 that reflects the laser light from the first laser unit 51A, a dichroic mirror 54B that transmits the laser light reflected by the reflecting mirror 53 and that reflects the laser light from the second laser unit 51B, a dichroic mirror 54C that transmits the laser light of wavelengths 635 nm and 559 nm passing via the dichroic mirror 54B and reflects laser light from the third laser unit 51C, and a dichroic mirror 54D that reflects the laser light of wavelengths 635 nm, 559 nm, and 473 nm passing via the dichroic mirror 54C and that transmits the laser light from the fourth laser unit 51D.

Furthermore, the observation laser combiner 50 is also provided with an acousto-optic device 57, such as an AOTF (Acousto-Optic Tunable Filter), that controls wavelength selection and intensity adjustment of the laser light. Laser light of a specific wavelength (observation laser light) controlled by the acousto-optic device 57 is guided to the observation unit 20 by the observation optical fiber 59.

Figure 6:
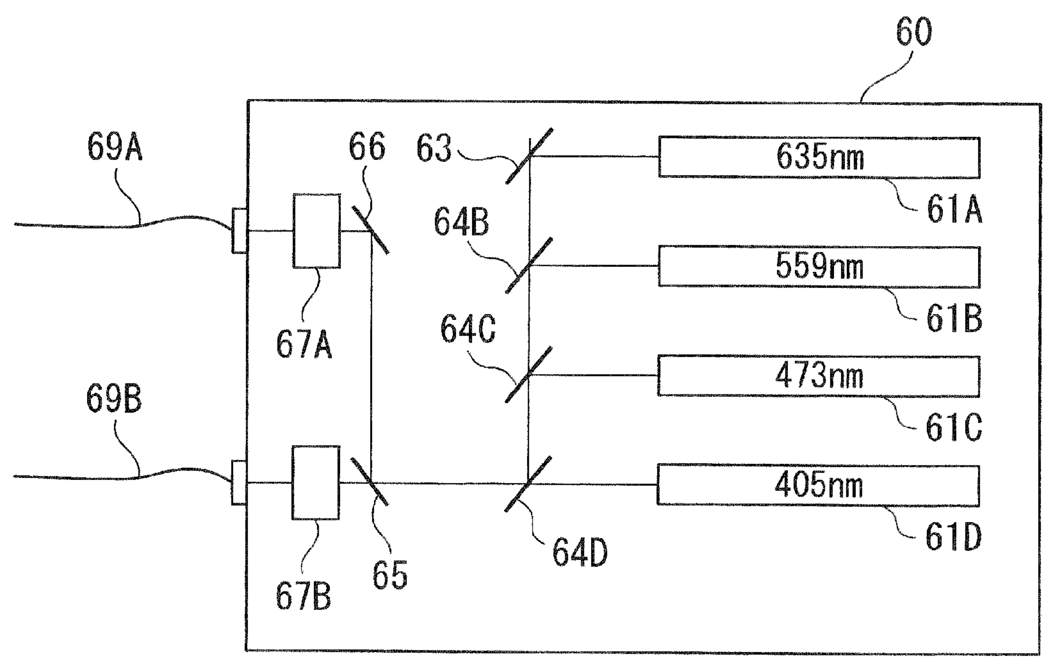
FIG. 6 is a diagram showing, in outline, a stimulation laser combiner in FIG. 1.

As shown in FIG. 6, the stimulation laser combiner 60 includes laser units 61A, 61B, 61C, and 61D having the same properties as the laser units 51A, 51B, 51C, and 51D; a reflecting mirror 63 that reflects laser light from the laser unit 61A; a dichroic mirror 64B that transmits the laser light reflected by the reflecting mirror 63 and that reflects laser light from the second laser unit 61B; a dichroic mirror 64C that transmits the laser light of wavelengths 635 nm and 559 nm passing via the dichroic mirror 64B and that reflects laser light from the third laser unit 61C; and a dichroic mirror 64D that reflects the laser light of wavelengths 635 nm, 559 nm, and 473 nm passing via the dichroic mirror 64C and that transmits laser light from the fourth laser unit 61D.

The stimulation laser combined 60 is also provided with a half-mirror 65 that transmits laser light of a specific wavelength that has passed via the dichroic mirror 64D and that reflects the laser light of other wavelengths; a total-reflection mirror 66 that totally reflects the laser light reflected by the half-mirror 65; and acousto-optic devices 67A and 67B that control wavelength selection and intensity adjustment of the laser light reflected by the total-reflection mirror 66 and the laser light transmitted through the half-mirror 65.

Laser light of a specific wavelength (first stimulus light) controlled by the acousto-optic device 67A is guided to the first stimulus unit 30 by the first stimulation optical fiber 69A, and laser light of a specific wavelength (second stimulus light) controlled by the acousto-optic device 67B is guided to the second stimulus unit 40 by the second stimulation optical fiber 69B.

The control box 70 is configured to adjust the light levels of the laser light emitted from each of the laser combiners 50 and 60 and to control image acquisition by the observation optical system 22 and the laser light irradiation timing of the stimulation optical systems 32 and 42. Also, the control box 70 is configured to switch the angle of each movable mirror 48 of the DMD 47 and to adjust the individual scanning conditions of the galvanometer mirrors 24A and 24B of the scanning unit 23 and the galvanometer mirrors 34A and 34B of the scanning unit 33.

The computer 80 includes a monitor 81 for displaying images acquired by the observation unit 20; a memory (adjustment storage unit) 83 for storing the control conditions and so forth of each of the units 20, 30 and 40; and a GUI unit (graphical user interface, region-specifying unit, adjustment unit) 85 for the user to set the control settings of the overall apparatus by interacting with the screen displayed on the monitor 81.

For the control conditions of each of the units 20, 30, and 40, the memory 83 stores, for example, the scanning conditions of the galvanometer mirrors 24A and 24B in the scanning unit 23, the scanning conditions of the galvanometer mirrors 34A and 34B in the scanning unit 33, the angle settings of each movable mirror 48 in the DMD 47, and so on.

By performing a drag operation with a mouse (not shown) on the image acquired by the observation optical system 22, the GUI unit 85 can be used to specify individual regions of interest (ROIs; stimulation regions) to be stimulated by the first stimulation optical system 32 and the second stimulation optical system 42. Also, the GUI 85 can be used to change the scanning conditions of the galvanometer mirrors 34A and 34B and the angle settings of the individual movable mirrors 48 in the DMD 47, to adjust the position and size of each area irradiated with laser light, via the control box 70.

The operation of the thus-configured microscope apparatus 100 according to this embodiment will be described below.

In this embodiment, a description is given of a case where an image of the specimen S is acquired by the observation unit 20, and the specimen S is simultaneously stimulated by the first stimulus unit 30 and the second stimulus unit 40 while observing the acquired image.

First, in the observation unit 20, observation laser light emitted by one of the laser units 51A, 51B, 51C, and 51D of the observation laser combiner 50 and guided by the observation optical fiber 59 is transmitted through the collimator lens 21 and the dichroic mirror 25 and is incident on the scanning unit 23. The observation laser light incident on the scanning unit 23 is reflected by the observation galvanometer mirrors 24A and 24B and enters the microscope main unit 10 via the connection port 9A.

The observation laser light introduced into the microscope main unit 10 is focused by the relay optical system 13A and is reflected at the dichroic mirror 15A towards the relay optical system 13B. Then, the observation laser light passes through the relay optical system 13B, is reflected at the folding mirror 17A, is transmitted through the relay optical system 13C, and is reflected at the folding mirror 17B, whereupon it passes through the relay optical system 13D and is radiated onto the specimen S by the objective lens 19.

When fluorescence is generated in the specimen S due to irradiation with the observation laser light, the fluorescence is collected by the objective lens 19 and returns along the light path in the opposite direction. This fluorescence passes via the relay optical system 13D, the folding mirror 17B, the relay optical system 13C, the folding mirror 17A, and the relay optical system 13B, is reflected at the dichroic mirror 15A towards the relay optical system 13A, and is introduced into the observation unit 20 via the connection port 9A.

The fluorescence introduced into the observation unit 20 is descanned by the galvanometer mirrors 24A and 24B, whereupon it is separated from light other than the fluorescence wavelength by the dichroic mirror 25 and is reflected towards the emission filter 27. Then, the fluorescence transmitted through the emission filter 27 is focused by the focusing lens 28 and is captured by the photoelectric conversion device 29.

Figure 7:
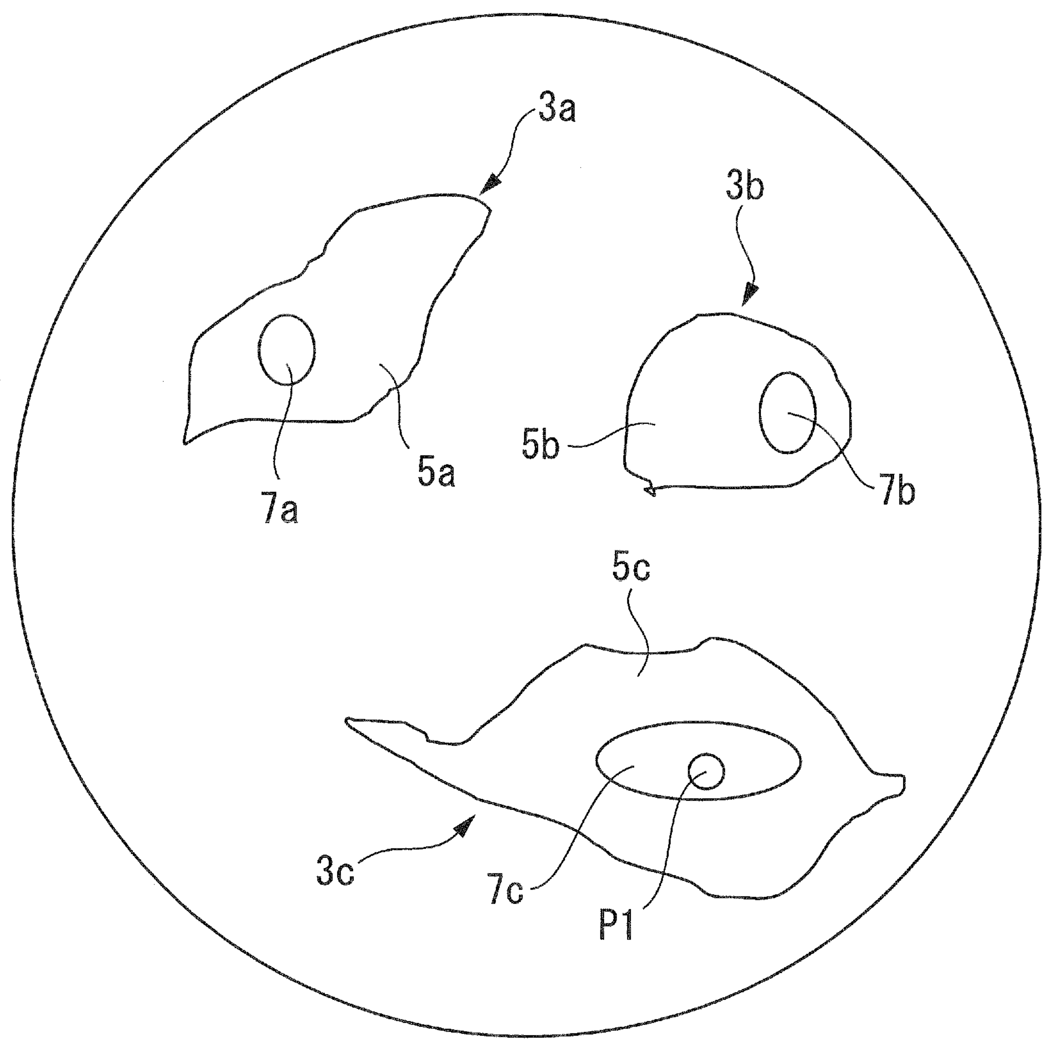
FIG. 7 is a diagram showing cells under observation.

Accordingly, an image of cells 3*a*, 3*b*, and 3*c* (specimens S) shown in FIG. 7, for example, is acquired and displayed on the monitor 81. This enables the cells 3*a*, 3*b*, and 3*c* to be observed in the image on the monitor 81. Reference numerals 5*a*, 5*b*, and 5*c* in the figure indicate the cytoplasms of the cells 3*a*, 3*b*, and 3*c*, respectively, and reference numerals 7*a*, 7*b*, and 7*c* indicate the nuclei of the cells 3*a*, 3*b*, and 3*c*, respectively.

Next, the individual cytoplasms 5*a*, 5*b*, and 5*c* of the respective cells 3*a*, 3*b*, and 3*c* are simultaneously stimulated by the second stimulus unit 40, and a stimulation region P1 in the nucleus 7*c* of the cell 3*c* is subjected to point-stimulation with high laser power by the first stimulus unit 30. In this case, by combining the individual laser light paths of the first stimulation optical system 32 and the second stimulation optical system 42 with the dichroic mirror 15B, and by combining the laser light path of the observation optical system 22 with those of the stimulation optical systems 32 and 42 using the dichroic mirror 15A, the optical systems 20, 30, and 40 can be used simultaneously without switching between them.

First, while observing the image of the cells 3*a*, 3*b*, and 3*c* displayed on the monitor 81, ROIs where the cells 3*a*, 3*b*, and 3*c* are to be stimulated are set using the GUI unit 85. In this embodiment, the cytoplasms 5*a*, 5*b*, and 5*c* of the respective cells 3*a*, 3*b*, and 3*c*, as well as the stimulation region P1 at the nucleus 7*c* of the cell 3*c*, are specified as ROIs.

Once the ROIs are set, a commence stimulation command is output from the GUI unit 85, and optical stimulation of the cells 3*a*, 3*b*, and 3*c* is performed. Here, via the operation of the control box 70, the angles of the movable mirrors 48 for irradiating the cytoplasms 5*a*, 5*b*, and 5*c* of the respective cells 3*a*, 3*b*, and 3*c* with the second stimulus light are set to the ON state, and the scanning conditions of the galvanometer mirrors 34A and 34B for irradiating the stimulation region P1 of the cell 3*c* with the first stimulus light are set. In addition, the light level of the laser light in the stimulation laser combiner 60 is adjusted.

In the second stimulus unit 40, the second stimulus light emitted from one of the laser units 61A, 61B, 61C, and 61D in the stimulation laser combiner 60 and guided by the second stimulation optical fiber 69B is converted to substantially collimated light by the collimator lens 41, and the cross-sectional intensity distribution thereof is equalized by the equalizing optical system 43, whereupon, it is radiated onto the DMD 47 via the folding mirror 45A.

The second stimulus light reflected towards the cells 3*a*, 3*b*, and 3*c* in the microscope main unit 10 by the movable mirrors 48 in the DMD 47 that are turned ON passes via the relay optical system 49A the folding mirror 45B, the relay optical system 49B, the folding mirror 45C, the relay optical system 49C, and the folding mirror 45D and is introduced into the microscope main unit 10 via the connection port 9C.

The second stimulus light introduced into the microscope main unit 10 is transmitted through the dichroic mirror 15B via the relay optical system 13H, the folding mirror 15C, the relay optical system 13I, and the relay optical system 13J and is combined with the light path of the first stimulation optical system 32. Then, the second stimulus light is transmitted through the dichroic mirror 15A via the relay optical system 13F and the relay optical system 13G and is combined with the light path of the observation optical system 22.

Similarly to the observation laser light, the second stimulus light combined with the light path of the observation optical system 22 passes via the relay optical system 13B, the folding mirror 17A, the relay optical system 13C, the folding mirror 17B, and the relay optical system 13D and is simultaneously radiated onto the cytoplasms 5*a*, 5*b*, and 5*c* of the respective cells 3*a*, 3*b*, and 3*c* by the objective lens 19. Accordingly, it is possible to simultaneously stimulate the cytoplasms 5*a*, 5*b*, and 5*c*.

On the other hand, in the first stimulus unit 30, the first stimulus light emitted from one of the laser units 61A, 61B, 61C and 61D in the stimulation laser combiner 60 and guided by the first stimulation optical fiber 69A is transmitted through the collimator lens 31 and is incident on the scanning unit 33. The first stimulus light incident on the scanning unit 33 is reflected by the galvanometer mirrors 34A and 34B and is introduced into the microscope main unit 10 via the connection port 9B.

The first stimulus light introduced into the microscope main unit 10 passes through the relay optical system 13E and is reflected by the dichroic mirror 15B to be combined with the light path of the second stimulation optical system 42. Then, similarly to the second stimulus light, the first stimulus light is transmitted through the dichroic mirror 15A via the relay optical system 13F and the relay optical system 13G and is combined with the light path of the observation optical system 22.

Similarly to the observation laser light and the second stimulus light, the first stimulus light combined with the light path of the observation optical system 22 passes via the relay optical system 13B, the folding mirror 17A, the relay optical system 13C, the folding mirror 17B, and the relay optical system 13D and is radiated onto the stimulation region P1 in the nucleus 7*c* of the cell 3*c* by the objective lens 19. Accordingly, it is possible to stimulate the stimulation region P1 with high laser power.

Here, the ROIs specified in the image on the monitor 81 and the regions actually stimulated by the stimulation optical systems 32 and 42 must coincide with each other. Adjustment of the ROIs and the actual stimulation regions may be performed using adjustment software, for example, when the product is configured at the time of shipping, or upon delivery of the product.

In this case, a technician or other person at the manufacturer mounts a specimen S on the stage 11, starts up the adjustment software, captures an image of the specimen S with the observation unit 20, and displays the image on the monitor 81. Then, by operating the GUI unit 85, the technician specifies ROIs in the image and irradiates the specimen S with laser light from the stimulation optical systems 32 and 42. The technician then checks that there is no mismatch, in terms of position and size, between the ROIs on the image and the laser irradiation areas that are actually irradiated.

Figure 8A:
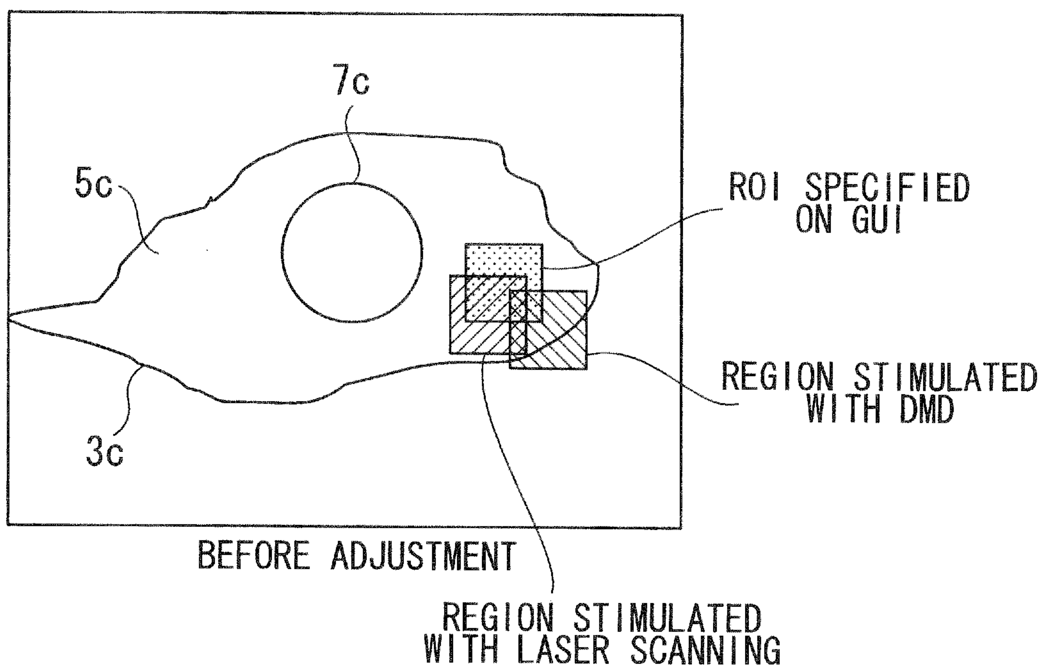
FIG. 8A is a diagram showing an image in which a region of interest (ROI) is not aligned with an actual stimulation region.
Figure 8B:
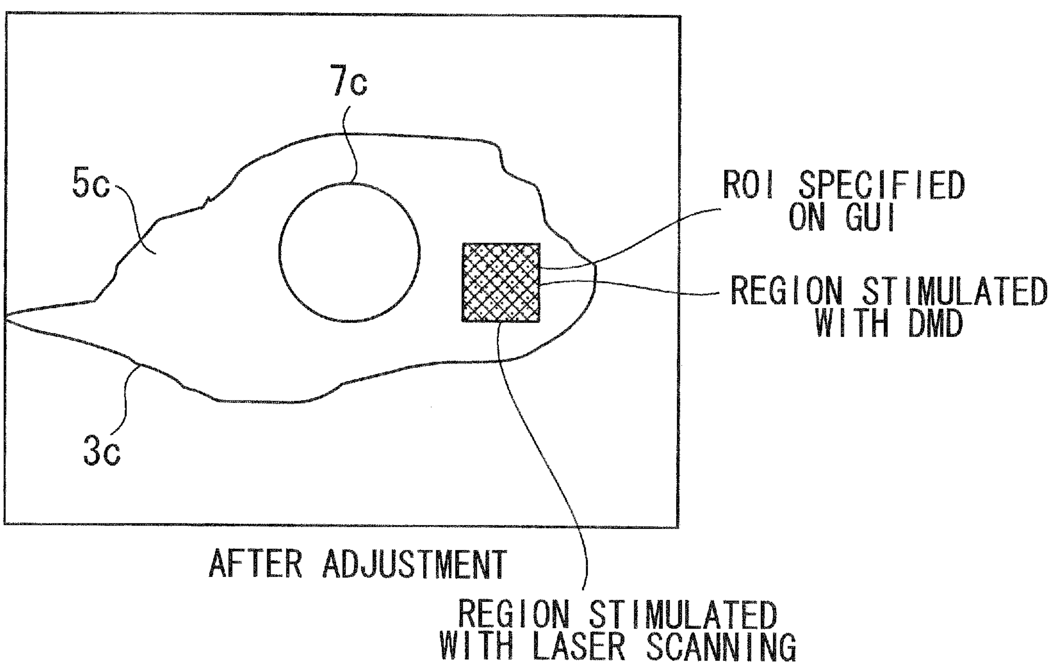
FIG. 8B is a diagram showing an image in which the ROI is aligned with the actual stimulation region.

For example, as shown in FIG. 8A, if there is a mismatch between the ROI and the region that is actually stimulated by the first stimulation optical system 32 (stimulation region to be laser scanned), the scanning conditions of the galvanometer mirror 34A and 34B are adjusted using the GUI unit 85 so that the position and size of the area irradiated with the first stimulus light match those of the ROI. Similarly, if there is a mismatch between the ROI and the region actually stimulated by the second stimulation optical system 42 (the region stimulated using the DMD), the angle settings of the movable mirrors 48 are adjusted using the GUI unit 85 so that the position and size of the area irradiated with the second stimulus light match those of the ROI. Accordingly, as shown in FIG. 8B, the ROI and the stimulation regions can be made to coincide with each other.

The scanning conditions of the galvanometer mirrors 34A and 34B and the angle settings of the movable mirrors 48, which are adjusted using the GUI unit 85, are stored in the memory 83. By doing so, if the ROI in the image is made to coincide with the stimulation regions actually stimulated by the stimulation optical systems 32 and 42 by using the GUI unit 85, it is possible to easily perform position adjustment at a later time based on the scanning conditions and the angle settings stored in the memory 83.

As described above, with the microscope apparatus 100 according to this embodiment, because the light paths of the individual optical systems 20, 30, and 40 are combined by the dichroic mirrors 15A and 15B, merely by selecting the observation optical system 22, the first stimulation optical system 32, or the second stimulation optical system 42, it is possible to rapidly adapt the system to applications where a strong stimulus is to be applied to the specimen S, or applications where an arbitrary entire region, or a plurality of regions on the specimen S, is to be simultaneously stimulated without any time lag, enabling desired optical stimulation to be performed.

Note that, in the microscope apparatus 100 according to this embodiment, the specimen S is simultaneously stimulated by the stimulation optical systems 32 and 42; however, for example, changes in the states of the cells 3*a*, 3*b*, and 3*c* that occur during optical stimulation may be observed and captured in a time-lapse manner. In this case, as shown in FIG. 9 for example, the laser irradiation timing of the first stimulation optical system 32 (laser scanning for stimulation) and the second stimulation optical system 42 (stimulation with the DMD) should be specified in time units or image capturing frame units with the GUI unit 85, and the series of state changes of the cells 3*a*, 3*b*, and 3*c* before optical simulation, during optical stimulation, and after optical stimulation should be captured with the observation optical system 22 (laser scanning for observation).

Figure 9:
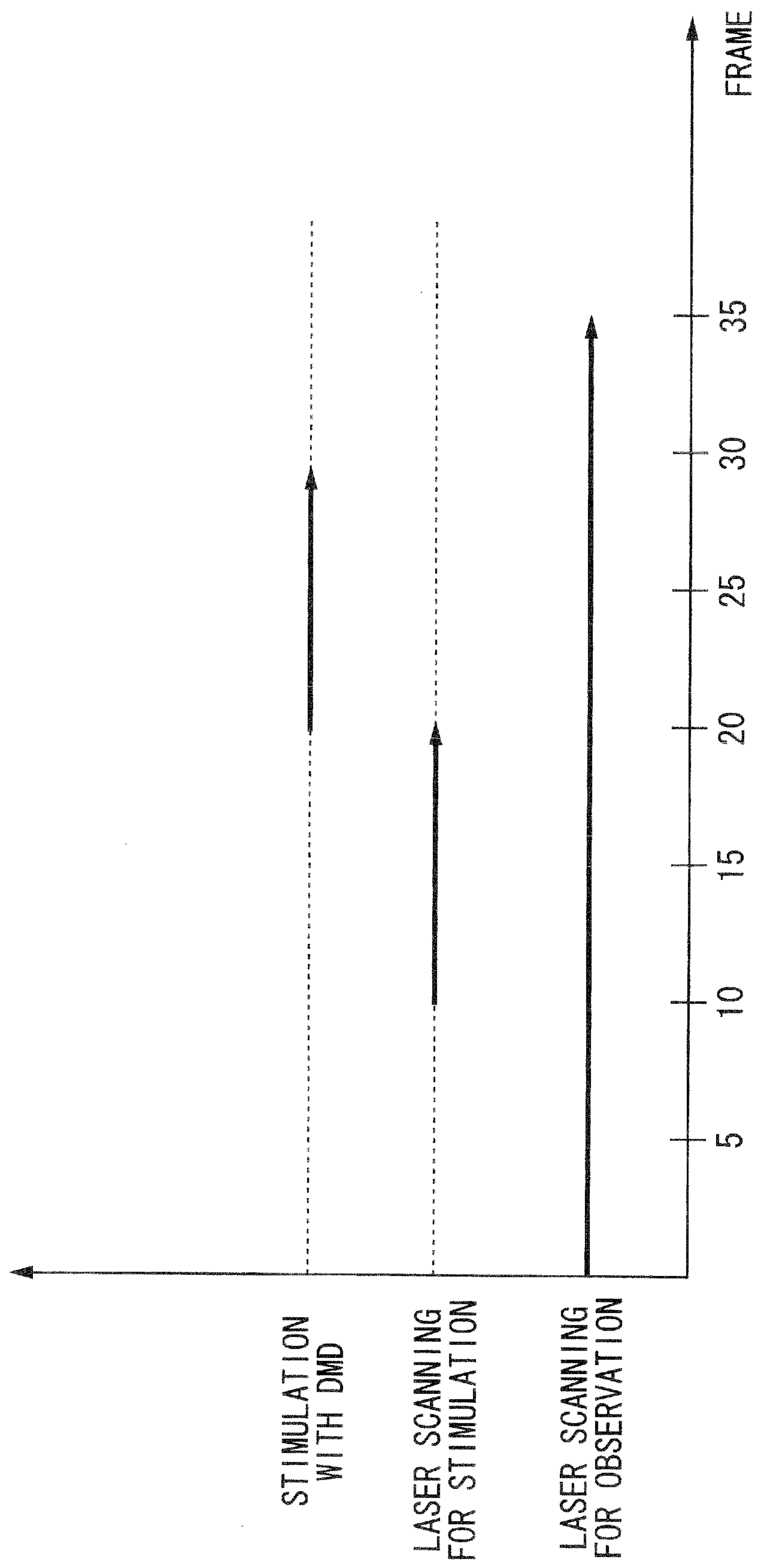
FIG. 9 is a diagram showing the timing of observation and stimulation in time-lapse observation.

FIG. 9 shows the case where image capturing is performed at 300 ms per image (per frame), and this is repeated 35 times (35 frames), showing the number of frames on the horizontal axis. Here, by using the GUI unit 85, the total number of captured frames (or time) is set, and the timing for stimulation by the first stimulation optical system 32 and the second stimulation optical system 42 is set.

Figure 10A:
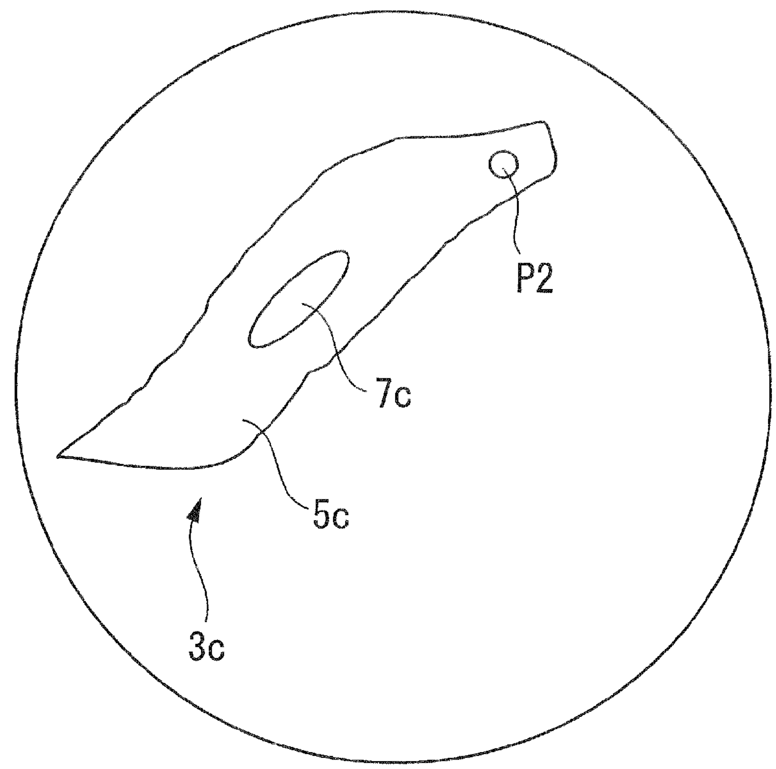
FIG. 10A is a diagram showing cells stimulated with a first stimulation optical system.
Figure 10B:
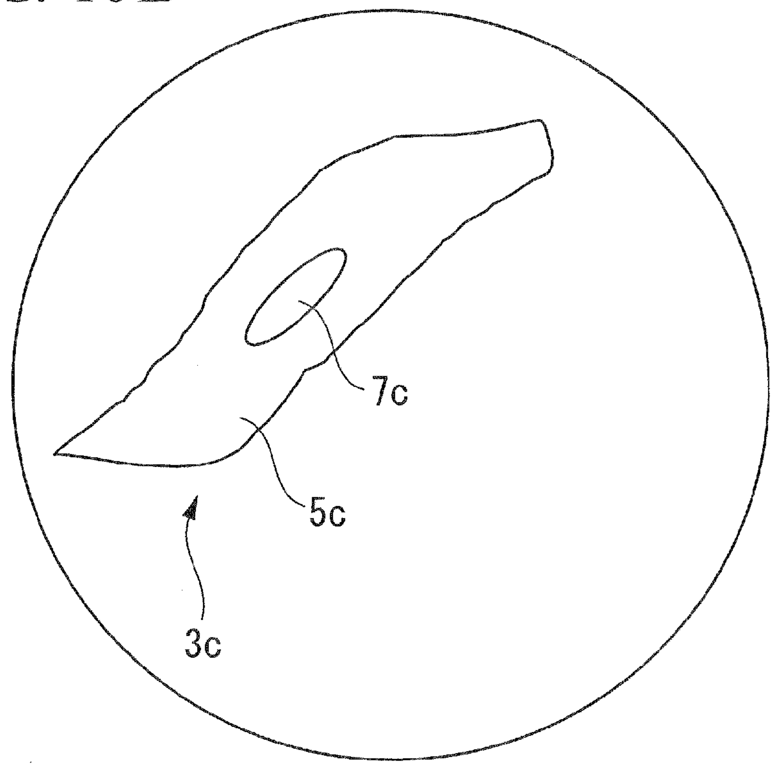
FIG. 10B is a diagram showing cells stimulated with a second stimulation optical system.

Then, for example, from the 10th frame to the 20th frame, point stimulation at a stimulation region P2 can be performed by the first stimulation optical system 32, as shown in FIG. 10A, and from the 20th frame to the 30th frame, the entire nucleus 7*c* of the cell 3*c* can be stimulated by the second stimulation optical system 42, as shown in FIG. 10B.

In this embodiment, the memory 83 may function as a light-level-adjustment storage unit that stores, in association with each other, the relationship between the optical stimulus intensity of the first stimulation optical system 32 and the light level of the first stimulus light and the relationship between the optical stimulus intensity of the second stimulation optical system 42 and the light level of the second stimulus light. In this case, the GUI unit 85 should function as a light-level adjusting unit for adjusting, depending on the light level of one of the first stimulus light and the second stimulus light, the light level of the other stimulus light, that is, the second stimulus light or the first stimulus light. In addition, for example, the relationships between the light level per pixel of the first stimulus light and the light level per pixel of the second stimulus light with an index regarding the light level of the stimulus light input to the GUI unit 85 should be associated with each other.

Accordingly, by using the GUI unit 85, it is possible to perform optical stimulation of the specimen S with the first stimulation optical system 32 and the second stimulation optical system 42, in an associated manner. For example, an application where the specimen S is stimulated by the first stimulation optical system 32 or the second stimulation optical system 42 can be easily applied to the other, that is, the second stimulation optical system 42 or the first stimulation optical system 32, thus enhancing the quantitativeness of the measurement.

This embodiment can be modified as follows.

Figure 11:
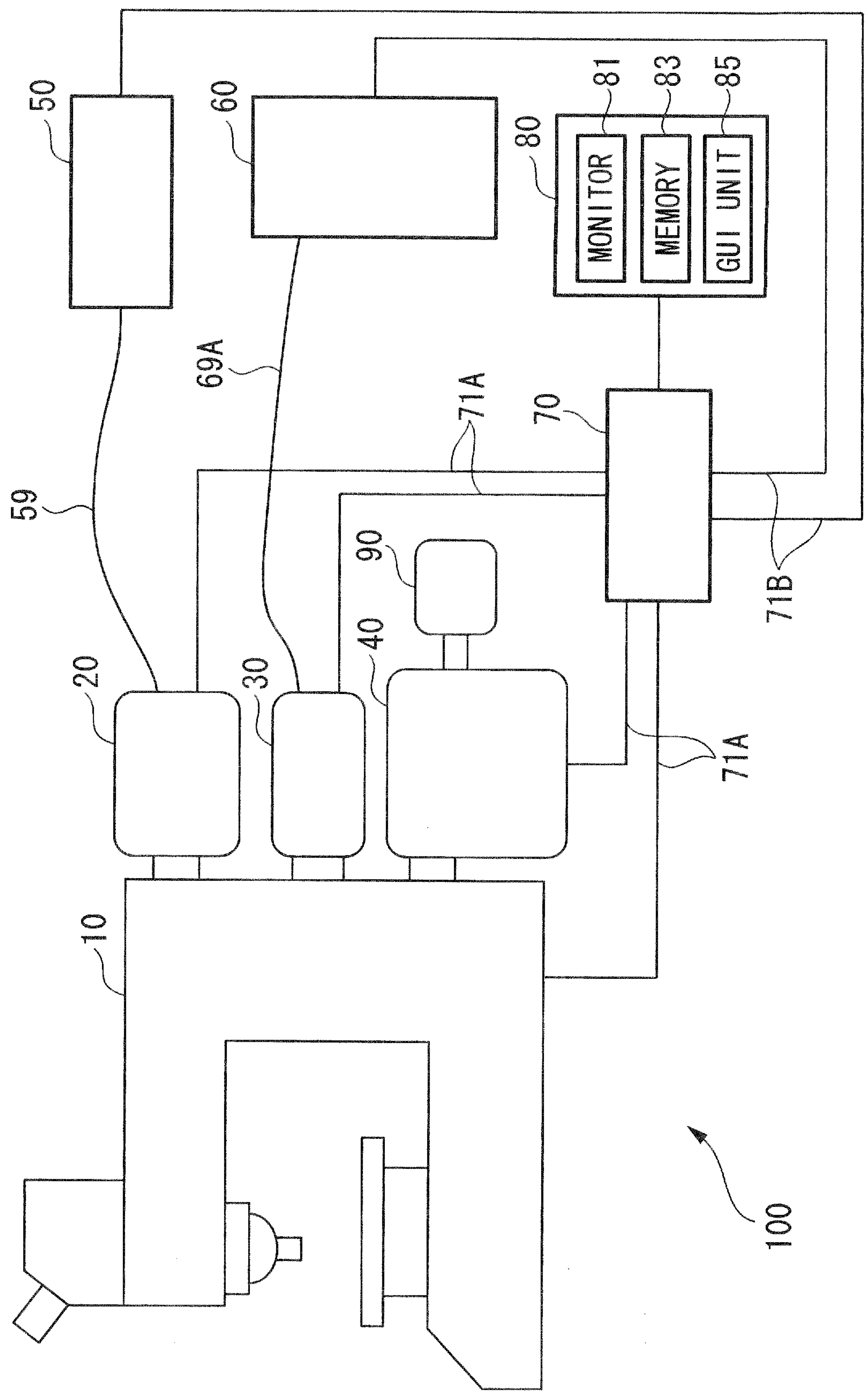
FIG. 11 is a diagram showing, in outline, the configuration of a microscope apparatus according to a modification of the first embodiment of the present invention.
Figure 12:
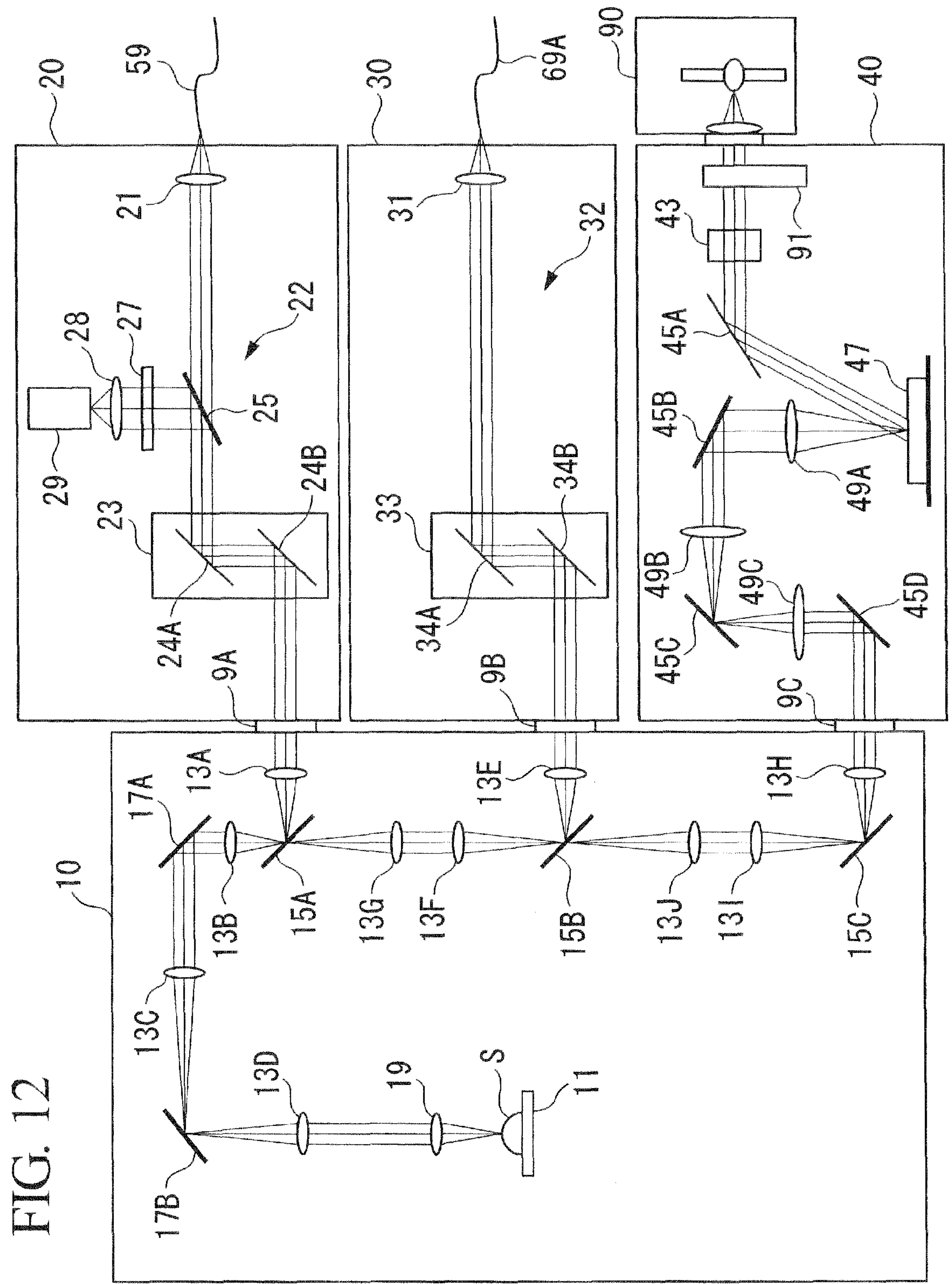
FIG. 12 is a diagram showing, in outline, the configuration of a microscope main unit, an observation unit, a first stimulus unit, and a second stimulus unit in FIG. 11.

For example, this embodiment has been exemplified with the stimulation laser combiner 60 serving as a light source for supplying laser light to the second stimulus unit 40; instead of this, however, as shown in FIG. 11, a lamp light source 90, such as a mercury lamp, may be employed. In this case, as shown in FIG. 12, an intensity-adjusting device 91, provided with an excitation filter and an intensity-adjusting mechanism, should be disposed between the lamp light source 90 and the equalizing optical system 43 of the second stimulus unit 40. As the intensity-adjusting device 91, a disk in which a plurality of excitation filters are disposed and a disk in which a plurality of ND filters are disposed (neither of which is shown) should be arranged so as to be capable of rotating around the optical axis.

In this embodiment, although the first stimulus unit 30 is of the form that is attached as a single unit to the microscope main unit 10 via the connection port 9B, two or more first stimulus units 30 may be mounted by adding connection ports and stimulation light path combiners (not shown) to the microscope main unit 10. With this configuration, it is possible to irradiate a plurality of sites on the specimen S with strong optical stimuli simultaneously, enabling compatibility with a wider range of applications.

Second Embodiment

Next, a microscope apparatus according to a second embodiment of the present invention will be described.

Figure 13:
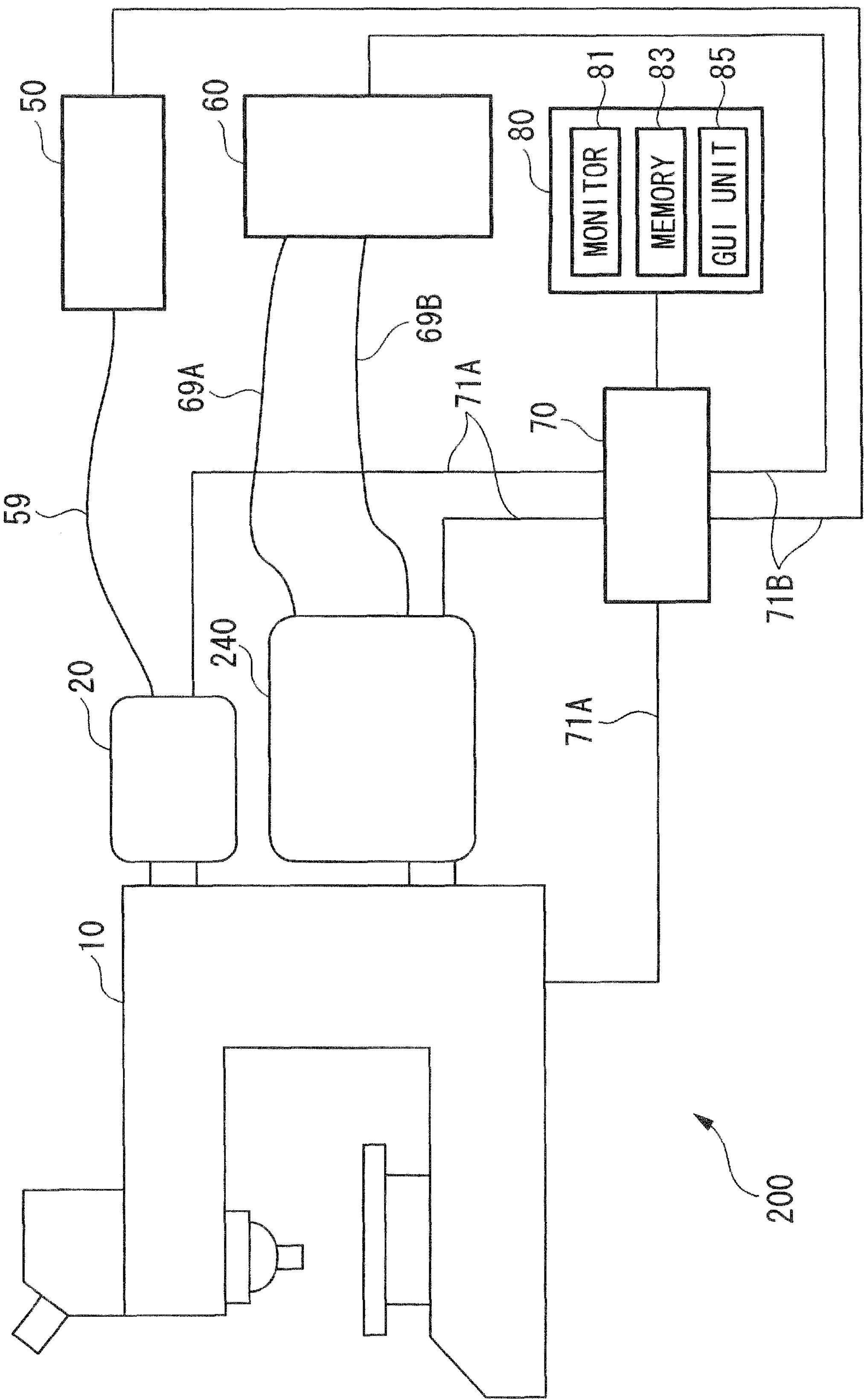
FIG. 13 is a diagram showing, in outline, the configuration of a microscope apparatus according to a second embodiment of the present invention.
Figure 14:
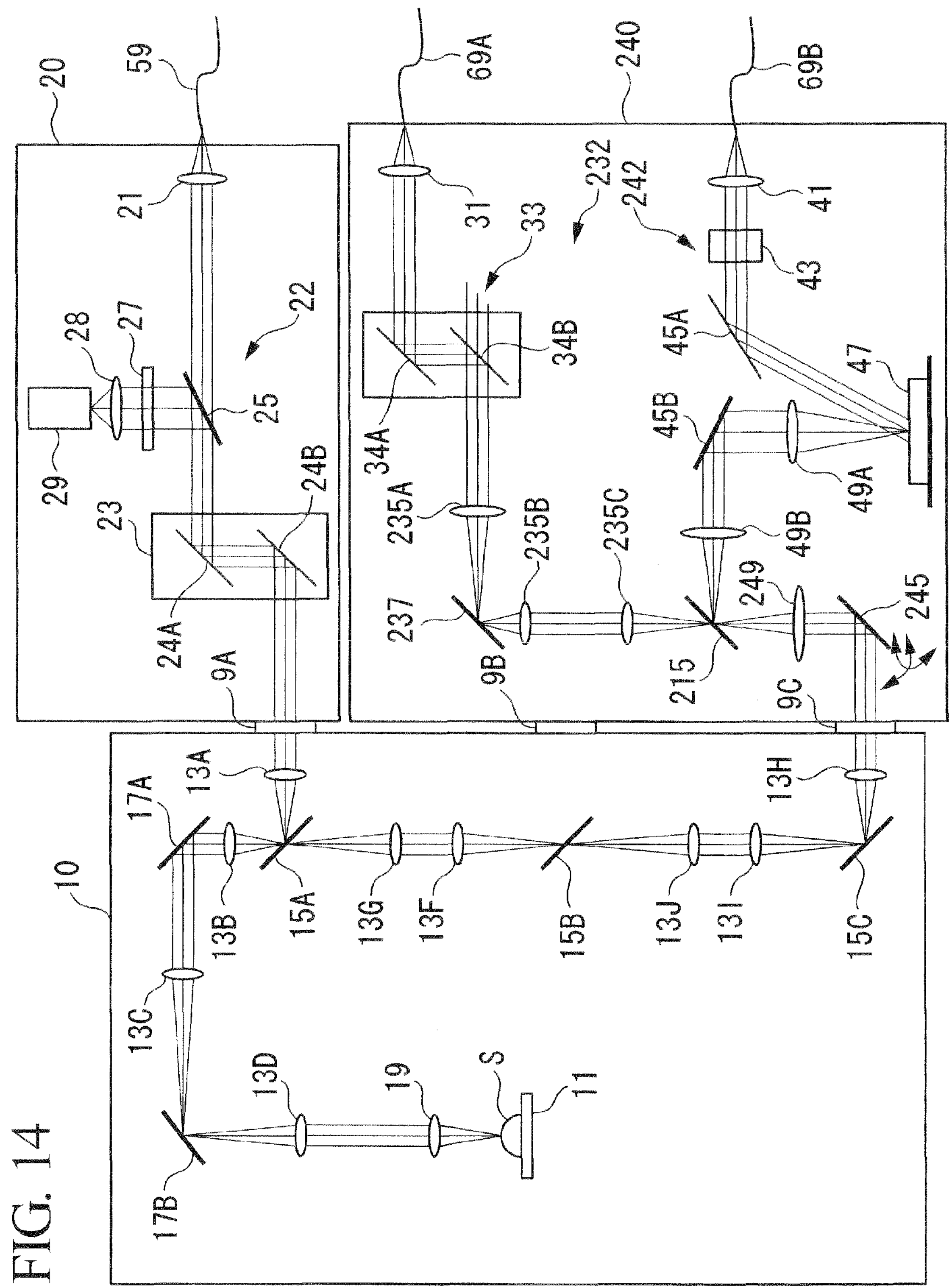
FIG. 14 is a diagram showing, in outline, the configuration of a microscope main unit, an observation unit, a first stimulus unit, and a second stimulus unit in FIG. 13.

As shown in FIG. 13 and FIG. 14, a microscope apparatus 200 according to this embodiment differs from the first embodiment in that a first stimulation optical system 232 and a second stimulation optical system 242, as well as a dichroic mirror (stimulus combining unit) 215 that combines the light paths thereof, are accommodated in the same housing 240.

In the following, parts having the same configuration as those in the microscope apparatus 100 according to the first embodiment will be assigned the same reference numerals, and a description thereof will be omitted.

The housing 240 is connected to the connection port 9C.

The first stimulation optical system 232 includes a relay optical system 235A, a folding mirror 237, a relay optical system 235B, and a relay optical system 235C that relay the first stimulus light scanned by the scanning unit 33.

The dichroic mirror 215 transmits first stimulus light from the relay optical system 235C in the first stimulation optical system 232 and reflects second stimulus light from the relay optical system 49B in the second stimulation optical system 242, thus combining the light path of the first stimulus light and the light path of the second stimulus light.

The first stimulation optical system 232 and the second stimulation optical system 242 include an optical-axis adjusting mirror 245 that reflects the first stimulus light and the second stimulus light combined by the dichroic mirror 215 and relayed by the relay optical system 249, causing them to pass through the connection port 9C.

The optical-axis adjusting mirror 245 is configured to be capable of adjusting the angle formed relative to the optical axis of the first stimulus light and the second stimulus light. By adjusting the angle of the optical-axis adjusting mirror 245 during attachment of the housing 240 to the microscope apparatus 10, the ROI specified on the image of the specimen S acquired by the observation unit 20 is aligned with the actual stimulation region. It is also possible to perform angle adjustment of this optical-axis adjusting mirror 245 using the GUI unit 85.

With the thus-configured microscope apparatus 200 according to this embodiment, it is possible to precisely combine, in advance, the light paths of the first stimulation optical system 232 and the second stimulation optical system 242 in the housing 240 by using the dichroic mirror 215, which facilitates light-path adjustment when combining the light paths of these stimulation optical systems 232 and 242 with the light path of the observation optical system 22 by using the dichroic mirror 15A. Note that, in this embodiment, the housing 240 is connected to the connection port 9C; however, it may be connected to the connection port 9B. Also, either the connection port 9B or 9C, whichever one is not used by the microscope main unit 10, may be used for a unit provided with another optical system.

For example, the first stimulus unit 30 described in the first embodiment may be attached to the connection port 9B of the microscope main unit 10. With this configuration, it is possible to simultaneously irradiate a plurality of locations on the specimen S with strong light stimuli, enabling compatibility with a wider range of applications.

Figure 15:
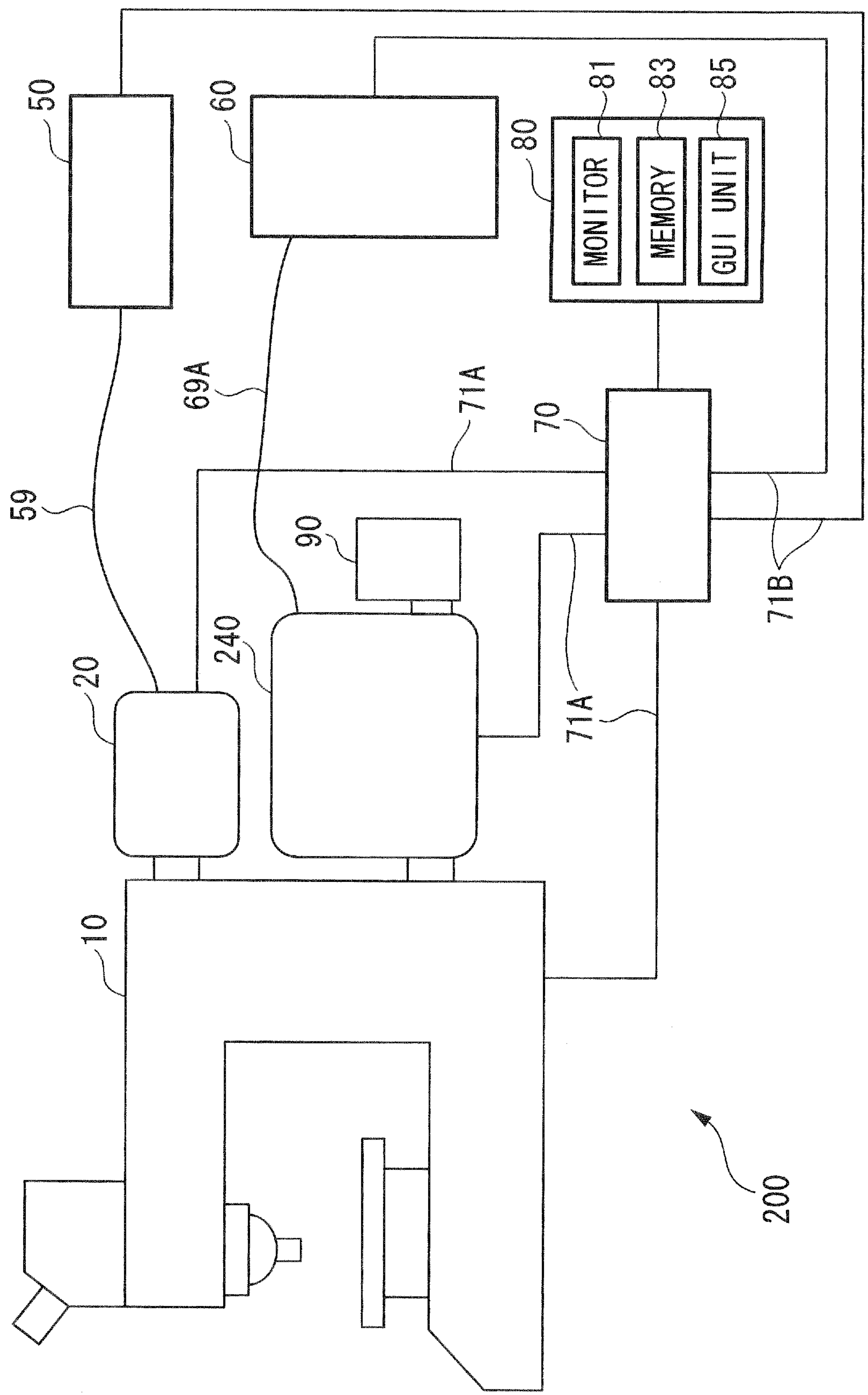
FIG. 15 is a diagram showing, in outline, the configuration of a microscope apparatus according to a modification of the second embodiment of the present invention.
Figure 16:
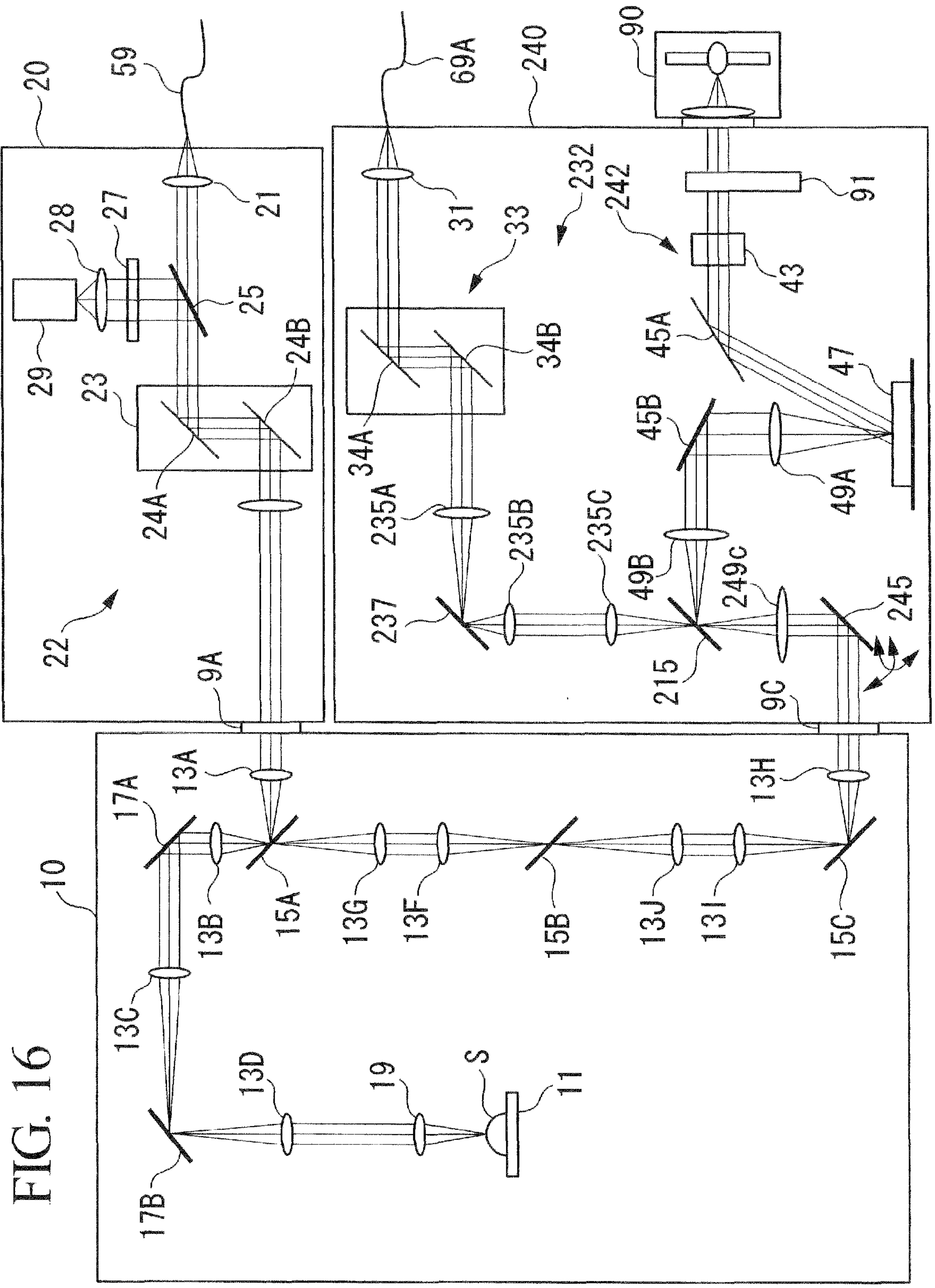
FIG. 16 is a diagram showing, in outline, a microscope main unit, an observation unit, a first stimulus unit, and a second stimulus unit in FIG. 15.

Note that, in this embodiment, as shown in FIG. 15, instead of the stimulation laser combiner 60, a mercury lamp 90 may be used as the light source for supplying laser light to the second stimulus unit 240. In this case, as shown in FIG. 16, an intensity-adjusting device 91 should be disposed between the mercury lamp 90 and the equalizing optical system 43.

Although the embodiments of the present invention have been described above with reference to the drawings, the specific configuration is not limited to these embodiments, and design changes and so forth that do no depart from the spirit of the present invention are also encompassed. For example, the present invention is not limited to being employed in the above-described embodiments and modifications thereof; without particular limitation, it may also be applied to embodiments formed by appropriately combining these embodiments and modifications thereof.

In the embodiments described above, a description has been given as applied to a case where the DMD 47 is exemplified as the spatial light modulator. Instead of this, however, it is possible to use a transmissive microelement array, for example an LCD (liquid crystal display), which has a plurality of microelements (not shown) arrayed two-dimensionally and in which the transmittance of each microelement is controlled to enable the second stimulus light to be selectively transmitted towards the specimen S. By individually controlling the transmittance of each pixel (microelement) on the LCD, it is possible to irradiate the specimen S with the second stimulus light while selectively switching the position irradiated with the second stimulus light.

What is claimed is:

1. A microscope apparatus comprising:

a first stimulation optical system including a galvanometer mirror that scans first stimulus light on a specimen to apply optical stimulus to the specimen;

a second stimulation optical system including a spatial light modulator that selectively switches an irradiation position of second stimulus light on the specimen to apply optical stimulus to the specimen;

a stimulation light-path combining section that combines a light path of the first stimulation optical system and a light path of the second stimulation optical system;

an observation optical system which acquires an image of the specimen, the observation optical system including a light source that illuminates the specimen, a scanning unit that scans illumination light on the specimen, and a photoelectric conversion device that receives light emitted from the specimen; and a whole-light path combining section that combines a light path of the observation optical system with the light paths of the first stimulation optical system and the second stimulation optical system combined by the stimulation light-path combining section.

2. A microscope apparatus according to claim 1, wherein the spatial light modulator includes a plurality of microelements arrayed two-dimensionally, and controls a transmittance of each microelement to selectively transmit the second stimulus light towards the specimen.

3. A microscope apparatus according to claim 1, wherein the spatial light modulator includes a plurality of microdeflection elements arrayed two-dimensionally, and switches an angle of each microdeflection element to selectively deflect the second stimulus light towards the specimen.

4. A microscope apparatus according to one of claim 1, wherein a plurality of the first stimulation optical systems are provided.

5. A microscope apparatus according to claim 1, further comprising:

a light-level-adjustment storage unit that stores, in association with each other, a relationship between an intensity of the optical stimulus from the first stimulation optical system and a light level of the first stimulus light and a relationship between an intensity of the optical stimulus from the second stimulation optical system and a light level of the second stimulus light; and a light-level adjusting unit that adjusts, depending on the light level of one of the first stimulus light and the second stimulus light, the light level of the other one of the first stimulus light and the second stimulus light.

6. A microscope apparatus according to claim 5, wherein the first stimulation optical system, the second stimulation optical system, and the stimulation light-path combining section are accommodated in a same housing.

7. A microscope apparatus according to claim 5, wherein a plurality of the first stimulation optical systems are provided.

8. A microscope apparatus according to claim 5, further comprising a control unit that controls the image acquisition by the observation optical system, an irradiation timing of the first stimulus light by the first stimulation optical system, and an irradiation timing of the second stimulus light by the second stimulation optical system.

9. A microscope apparatus according to claim 1, further comprising a region-specifying unit that specifies, on the image acquired by the observation optical system, individual stimulation regions to be stimulated by the first stimulation optical system and the second stimulation optical system.

10. A microscope apparatus according to claim 9, further comprising an adjusting unit that adjusts scanning conditions of the scanning unit and an irradiation position of the second stimulus light on the specimen with the spatial light modulator.

11. A microscope apparatus according to claim 10, further comprising an adjustment storage unit that stores the adjusted scanning conditions of the scanning unit and the irradiation position of the second stimulus light on the specimen with the spatial light modulator, as adjusted by the adjusting unit.

* * * * *